United States Patent [19]

Henning

[11] Patent Number: 5,119,869

[45] Date of Patent: Jun. 9, 1992

[54] METHOD OF PRODUCING A TELESCOPIC COVER

[75] Inventor: Kurt Henning, Munich, Fed. Rep. of Germany

[73] Assignee: Gebr. Hennig GmbH, Fed. Rep. of Germany

[21] Appl. No.: 596,958

[22] Filed: Oct. 15, 1990

[30] Foreign Application Priority Data

Oct. 31, 1989 [DE] Fed. Rep. of Germany ....... 3936212

[51] Int. Cl.⁵ ............................................. E05D 15/06
[52] U.S. Cl. .................... 160/202; 409/134; 74/608
[58] Field of Search .............. 160/202, 197, 211, 214, 160/222, 223; 248/459, 460, 174; 52/823, 822; 74/608; 29/422, 897, 897.3, 897.31, 897.32, 462, DIG. 56, DIG. 60, DIG. 86; 408/67; 409/134; 72/379.2; 51/271, 269

[56] References Cited

U.S. PATENT DOCUMENTS

| 2,021,751 | 11/1935 | Straubel | 52/822 X |
| 2,805,907 | 9/1957 | Oom | 52/822 X |
| 3,315,431 | 4/1967 | Yake | 52/823 |
| 3,376,670 | 4/1968 | Jones | 52/823 X |
| 4,784,429 | 11/1988 | Hodger | 160/202 |

FOREIGN PATENT DOCUMENTS 3522884 10/1986 Fed. Rep. of Germany ...... 160/202

Primary Examiner—Carl D. Friedman
Assistant Examiner—Korie H. Chan
Attorney, Agent, or Firm—Hopkins & Thomas

[57] ABSTRACT

The invention relates to a method of producing a telescopic cover using one single profile which is straight in the initial state and has a groove into which a flat material blank intended to form the top wall and the side walls is inserted. This material blank and the profile are then bent together to form the top wall and side walls, the outer strip of the profile being stretched in the region of the two bend lines without cracking to form a rounded outer contour.

9 Claims, 3 Drawing Sheets

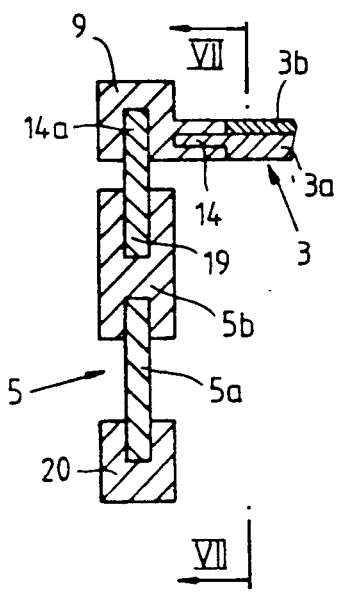
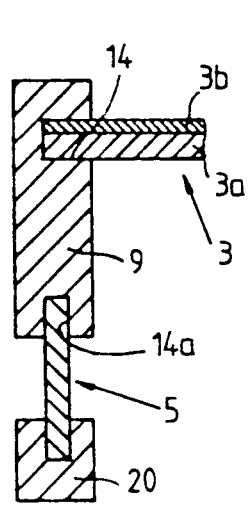
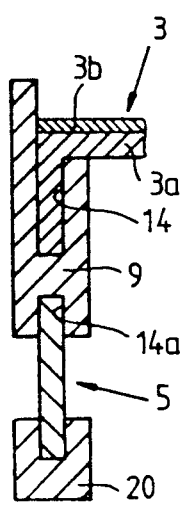
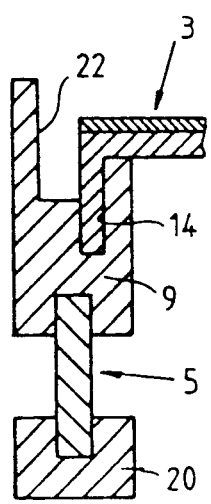
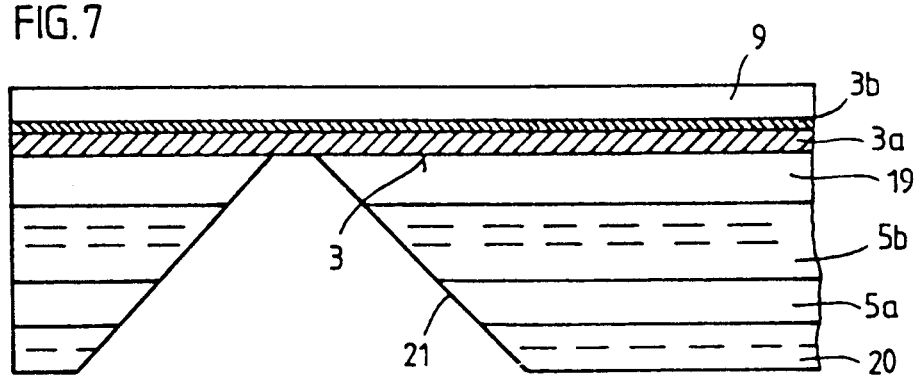

METHOD OF PRODUCING A TELESCOPIC COVER

FIELD OF THE INVENTION

The invention relates to a method for producing a telescopic cover and to a telescopic cover particularly for use with machine tools.

BACKGROUND OF THE INVENTION

A method of producing a telescopic cover, particularly for machine tools, wherein the cover element is formed of a plurality of cover elements, each having a top wall and two side walls and a connecting element having a groove therein receives the top wall or the side walls, is known from published German Patent Specification No. DE 3522884 C1, and from its U.S. equivalent, U.S. Pat. No. 4,771,906 of Henning et al.

In that method, which was developed by the applicant, an elongated connecting profile is used which ensures a tongue and groove connection between the top wall and the rear wall as well as between the two side walls and the rear wall. By means of the connecting profile a very simple, angularly correct assembly of the top wall and the side walls with the rear wall is ensured.

This known method provides for the use of separate connecting profiles for connecting the top wall and rear wall on the one hand and for connecting the side walls to the rear wall on the other hand, i.e. a total of three connecting profiles which are cross-cut to form mitres at the junction points (i.e. at the junctions of the top wall with the side walls).

The object of the invention is to make further developments to such a method as well as the telescopic cover in such a way that the production of the telescopic cover is further simplified.

SUMMARY OF THE INVENTION

Thus according to the invention one single profile is used in the rearward region of each cover element, this profile being straight in the initial state and its length being greater than the width of the cover element.

In a preferred embodiment this profile is provided with two triangular cut-outs which are spaced at distances corresponding to the width of the cover element and extend from the long edge of the profile facing away from the strips through the inner strip and through the groove as far as the outer strip of the profile, so that the inner strip is interrupted at two points whilst the outer strip remains continuous over its entire length.

A flat material blank which is intended to form the top wall and the side walls is then set into the groove of this straight profile. This flat material blank and the straight profile are then bent together to form the top wall and side walls, and the continous outer strip of the profile is stretched without cracking in the region of the two edge lines and forms a rounded outer contour.

Contrary to all expectations, in the tests on which the invention is based it proved possible to stretch the outer strip of the profile in the region of the two edge lines without cracking. Thus this corner zone of the profile is given a rounded outer contour which does not require any further finishing. The corner zone formed by the stretched material ensures the necessary sealing of the end region of the cover element.

The rounded outer contour of the two corner zones of the profile also proves advantageous for the sliding movement of the cover element within the telescopic cover, particularly since the top wall and the two side walls of the next larger cover element also have a certain bending radius at their bend zones.

The invention will be explained in greater detail below with the aid of several embodiments.

BRIEF DESCRIPTION OF THE DRAWINGS

FIG. 6 shows a section through a further embodiment, FIG. 7 shows a sectional view along the line VII—VII of FIG. 6, FIGS. 8 to 10 shows sections of three further embodiments of the invention.

DETAILED DESCRIPTION

Figure 1:
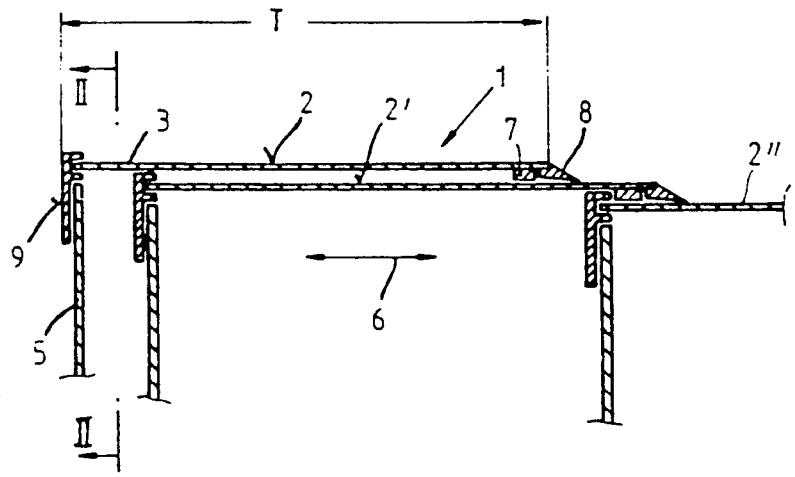
FIG. 1 shows a partial longitudinal section through a telescopic cover according to the invention.

Of the entire telescopic cover 1, only three cover elements 2, 2', 2" are shown on FIG. 1 which can be moved relative to one another in the longitudinal direction. Since these cover elements are all constructed in the same way, it will be sufficient to describe the cover element 2 below.

The cover element 2 comprises top wall 3, two side walls 4, 4a and a rear wall 5. The top wall 3 and the side walls 4, 4a in this case are constructed in one piece and—as will be explained ingreater detail below—are made from one single material blank.

A stop strip 7 and a scraping element 8 are arranged on the underside of the top wall 3 in the front region of the cover element 2 which is movable to and fro in the direction of the arrow 6.

Figure 3:
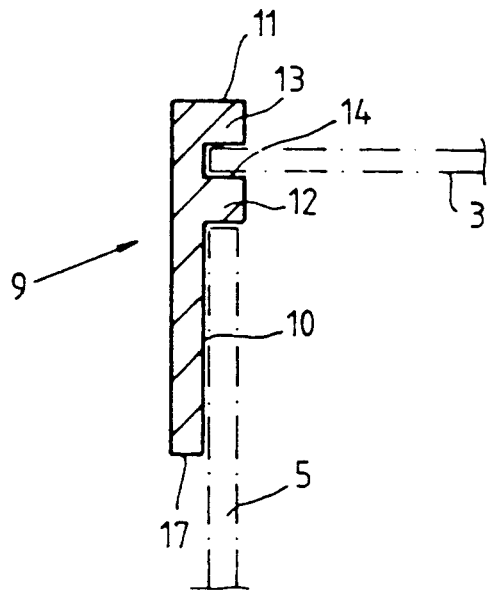
FIG. 3 shows a cross-section through the prlfile used as a connecting element.

A profile 9, the cross-section of which can be seen from FIG. 3, serves to connect the rear wall 5 to the top wall 3 and to the side walls 4, 4a. This profile 9 has on one broad side 10 adjacent to the long edge 11 two parallel strips 12, 13 which run in the longitudinal direction of the profile 9 and enclose a groove 14 between them.

Figure 4:
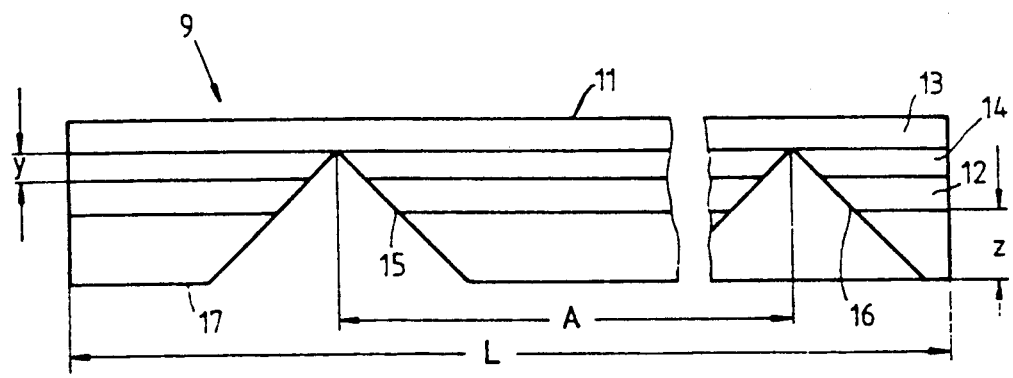
FIG. 4 shows a top view of the profile which has not yet been bent but is provided with two cut-outs.

In the initial state (cf. FIG. 4) the profile 9 is straight and has a length L which is greater than the width B (cf. FIG. 2) of the cover element 2.

This profile 9 is provided with two triangular cut-outs 15, 16 spaced from one another by a distance A which corresponds to the width B of the cover element 2. These cut-outs extend from the long edge 17 of the profile 9 facing away from the strips 12, 13 through the inner strip 12 and through the groove 14 as far as the outer strip 13, so that the inner strip 12 is interrupted at two points (namely in the region of the cut-outs 15 and 16), whilst the outer strip 13 is continuous over the entire length of the profile.

Thus the production of the cover element 2 by the method according to the invention takes place as follows:

The profile 9, which is straight in the initial state, is first of all provided with the cut-outs 15 and 16 described with the aid of FIG. 3. Then a flat material blank which is intended to form the top wall 3 and the two side walls 4 and 4a is inserted into the groove 14 of this straight profile.

Figure 5:
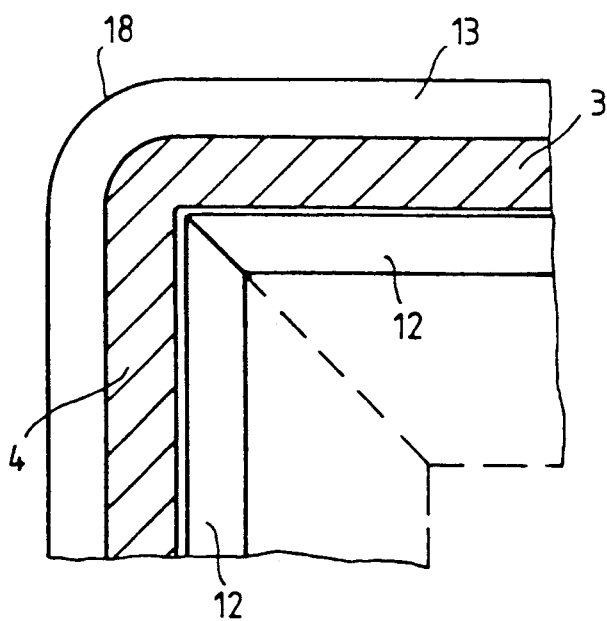
FIG. 5 shows the detail x according to FIG. 2 on an enlarged scale.

Then this flat material blank and the straight profile 9 are bent together to form the top wall 3 and the side walls 4, 4a. In the course of this the continuous outer strip 13 of the profile 9 is stretched in the region of the two edge lines without cracking to form a rounded outer contour 18, as is illustrated schematically in FIG. 5.

The connection between the profile 9 and the top wall 3 and the side walls 4, 4a can be made by welding, and the welded joint can be produced either before or after the bending operation.

If, as is assumed in the embodiment described, the cover element is to be provided with a rear wall 5, then this rear wall is connected to the profile 9 after the described bending of the profile 9 and the material blank (which forms the top wall 3 and the side walls 4 and 4a). In this case the rear wall 5 advantageously lies adjacent to the inner strip 12 and flat on the broad side 10 of the profile 9 (cf. FIG. 3, in which the position of the top wall 3 and the rear wall 5 are shown by dash-dot lines).

However, it is also possible within the scope of the invention to construct the cover elements without rear walls. In this case slide elements can be connected to the profile 9 after the bending of the flat sheet material blank (which forms the top wall 3 and the side walls 4, 4a) and the straight profile 9. These slide elements are supported in a known manner for example on the guideway of a machine tool for which the telescopic cover is intended as protection.

With its strip 13 which projects upwards over the top wall 3 the profile 9 forms a stop which co-operates with the stop strip 7 of the next larger cover element and ensures that when the telescopic cover is extended the relevant cover element is entrained by the next larger cover element.

The width of the groove 14 of the profile 9 (dimension y in FIG. 4) is chosen according to the material thickness of the material blank used to form the top wall 3 and side walls 4, 4a.

The dimension z (cf. FIG. 4) is equally variable and is chosen according to the bearing surface required for fixing the rear wall 5 (or slide elements).

The profile 9 can for example be produced from brass, whilst the top wall, side walls and rear wall of the cover element are made from sheet steel.

However, numerous other material combinations are possible within the scope of the invention. Thus in particular aluminium and plastics materials can also be used. In addition compound materials and reinforcements are of course possible.

It also goes without saying that, if required, the rear wall 5 can be constructed in its upper region as a channel in order to remove fluid.

Finally, a particular advantage of the method according to the invention resides in the fact that the machine used for the bending operation only needs to have a bending length corresponding to the depth T (cf. FIG. 1) of the cover elements, since the rear wall does not have to be produced by bending but is attached in flat form to the profile 9.

The flat material blank intended to form the top wall and the side walls can be connected to the straight profile by a clamped, welded, screwed or glued connection or also by any combination of these types of connection. Inductive welding methods are also advantageous in which the welding material is placed in the base of the groove in the form of a welding wire.

All connections can be produced either before or after the bending operation.

In the further embodiment illustrated in FIGS. 6 and 7 the profile 9 contains two grooves 14, 14a which are arranged approximately at right angles to one another. The groove 14 again serves to receive the top wall 3, which in this embodiment consists of a plastic layer 3a and a metal overlay 3b.

A connecting element 19 which connects the profile 9 to the rear wall 5 engages in the groove 14a. In the embodiment according to FIGS. 6 and 7 the rear wall 5 consists of a rear wall part 5a and a frame-like reinforcing profile 5b. The rear wall 5 has slides 20 on the underside.

As can be seen from the sectional view according to FIG. 7, the rear wall 5 has at both bend points (only one of which is shown in FIG. 7) a trapeziform cut-out 21 which extends as far as the top wall 3. Thus in this embodiment the profile 9 does not have any cut-out at the bend points. However, in view of its relatively small height it can nevertheless stretch during the bending operation without cracking to form a rounded outer contour.

In the embodiment according to FIG. 8 the profile 9 is again provided with two grooves 14 and 14a, of which the groove 14 serves to receive the top wall 3 (and the side walls 4, 4a which are not visible in FIG. 8), whilst the rear wall 5 engages in the groove 14a.

Figure 2:
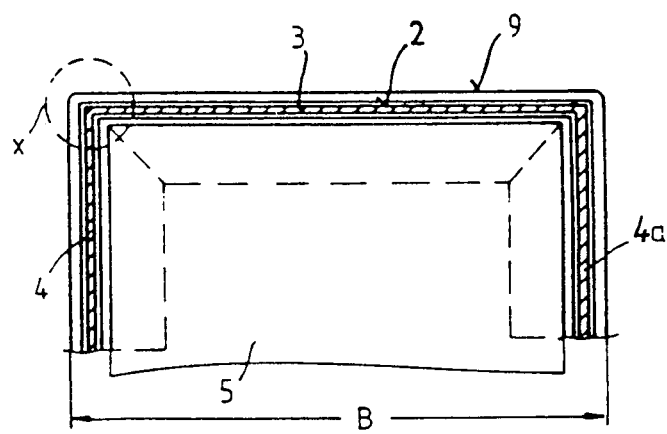
FIG. 2 shows a section along the line II—II in FIG. 1.

In this embodiment not only the rear wall 5 but also the profile 9 is provided at both bend points with a triangular or trapeziform cut-out which extends as far as the top wall 3 (corresponding to the cut-outs 15, 16 in FIG. 2 or corresponding to the cut-out 21 in FIG. 7).

In the variant illustrated in FIG. 9 the grooves 14 and 14a lie above one another and parallel to one another. The top wall 3 is bent at its edge which is intended for engagement in the groove 14. In this embodiment the part of the profile 9 projecting above the top wall 3 forms a stop for entrainment of the next larger cover element (just as in all the other variants).

The variant illustrated in FIG. 10 largely corresponds to the construction according to FIG. 9. However, in this embodiment a fluid channel 22 which is open at the top is provided in the profile 9 adjacent to the groove 14 which is intended to receive the top wall 3.

I claim:

1. A method of making a telescopic cover assembly having a plurality of cover elements telescopically movable with respect to each other, each cover element having a top wall and first and second side walls, and a connecting profile having a groove therein adapted to receive at least one of the walls, the method comprising the steps of:

forming a connecting profile from a single elongated member having a length greater than the width of the top wall wherein the connecting profile is used as a connecting element which is formed having two parallel inner and outer strips extending in the longitudinal direction of the profile on one broad side of the profile adjacent one long edge thereof, the strips forming the groove between them;

and including the steps of forming bending points in the elongated member by forming two triangular cut-outs spaced from one another by a distance which corresponds to the width of the cover element, the cut outs extending from a second long edge of the profile on the broad side thereof remote from the strips through the inner strip and through the groove as far as the outer strip thereby interrupting the inner strip at two points while the outer strip remains continuous the entire length of the profile;

inserting a single flat material blank having a width at least equal to the width of the top wall plus the height of each side wall into the groove of the elongated connecting profile; and bending the connecting profile and the flat material blank together at the first and second bending points to form without cracking a cover element having a top wall and depending side walls, and having a rounded contour along the lines of the bends.

2. A method of making a telescopic cover assembly having a plurality of cover elements telescopically movable with respect to each other, each cover element having a top wall and first and second side walls defining an interior space and having a rear end reciprocally movable within the interior space of an adjacent cover element, and a connecting profile having a groove therein adapted to receive at least one of the walls, the method comprising the steps of:

forming the connecting profile from a single elongated member having a length greater than the width of the top wall;

forming cut-out portions in the connecting profile to form bending points spaced apart a distance approximately equal to the width of the top wall;

inserting a single flat blank having a width at least equal to the width of the top wall plus the height of each side wall into the groove of the elongated connecting profile to form the rear end of the cover element; and bending the connecting profile and the flat material blank together at the first and second bending points to form without cracking a cover element having a top wall and depending side walls, and having a rounded contour along the lines of the bends.

3. The method as claimed in claim 2 for making a telescopic cover assembly, the cover elements of which each have a rear wall which rests flat on a broad side of the connecting profile and extends toward the interior space, including the step of connecting the rear wall to the connecting profile after bending the flat material blank and the straight connecting profile.

4. A telescopic cover assembly comprising a plurality of cover elements telescopically removable with respect to each other in the longitudinal direction of the assembly, each of said cover elements comprising at least a top wall and first and second side walls, a connecting profile having a first groove therein, said profile being formed from a single elongated member having a length greater than the width of the top wall of said cover element, a single sheet material blank being inserted into said first groove, said connecting profile with said material blank inserted in said first groove being bent at first and second points along the length thereof to bend said material blank along bend lines to form said top wall and said first and second side walls, with said cover element having a crack free rounded outer contour along each of the bend lines, wherein said connecting profile has a broad side having first and second long edges and inner and outer parallel strips which run in the longitudinal direction of the connecting profile adjacent said first long edge and enclose between them said first groove into which said material blank is inserted;

said inner strip of said connecting profile being interrupted by a miter cut in the region of each of the two bend lines of the material blank forming the top wall and the two side walls, the outer strip of said profile which is continuous over its entire length being stretched in the region of said first and second points forming a crack free rounded contour.

5. A telescopic cover assembly comprising a plurality of cover elements telescopically movable with respect to each other in the longitudinal direction of the assembly, each of said cover elements comprising at least a top wall and first and second side walls, a connecting profile having a first groove therein, said profile being formed from a single elongated member having a length greater than the width of the top wall of said cover element and having a second groove adapted to receive a rear wall, a single material blank being inserted into said first groove, said connecting profile with said material blank inserted in said first groove being bent at first and second points along the length thereof to bend said material blank along bend lines to form said top wall and said first and second side walls, with said cover element having a crack-free rounded outer contour along each of the bend lines, said rear wall and said connecting profile having at said bending points a trapeziform cut-out which extends to said top wall.

6. A telescopic cover assembly as claimed in claim 5, wherein said rear wall has a frame-like reinforcing profile which is interrupted by said trapeziform cut-outs.

7. A telescopic cover assembly comprising a plurality of cover elements telescopically movable with respect to each other in the longitudinal direction of the assembly, each of said cover elements comprising at least a top wall and first and second side walls defining an interior space and having a first end adapted to be reciprocally movable within the interior space an adjacent cover element, a connecting profile having a first groove therein, said profile being formed from a single elongated member having a length greater than the width of the top wall of said cover element and having first and second cut-out portions forming first and second bend points spaced apart a distance approximately equal to the width of said top wall, a single sheet material blank being inserted into said first groove to form said first end of said cover element, and said connecting profile with said material blank inserted in said first groove being bent at said first and second bending points to bend said material blank along bend lines to form said top wall and said first and second side walls, with said cover element having a crack-free rounded outer contour along each of the bend lines.

8. A telescopic cover assembly as claimed in claim 7 wherein said profile has a second groove adapted to receive a rear wall adjacent said first end, said rear wall extending toward said interior space.

9. A telescopic cover assembly comprising a plurality of cover elements telescopically movable with respect to each other in the longitudinal direction of the assembly, each of said cover elements comprising at least a top wall and first and second side walls,
- a connecting profile having a first groove therein, said profile being formed from a single elongated member having a length greater than the width of the top wall of said cover element,
- a single material blank being inserted into said first groove,
- said connecting profile with said material blank inserted in said first groove being bent at first and second points along the length thereof to bend said material blank along bend lines to form said top wall and said first and second side walls, with said cover element having a crack-free rounded outer contour along each of the bend lines,
- said connecting profile having formed therein a fluid channel which is open at the top adjacent said first groove.

* * * * *